Feb. 13, 1940.  R. A. WYATT  2,190,583
DUAL WHEEL STRUCTURE
Filed Aug. 19, 1937  2 Sheets-Sheet 1

INVENTOR
R. A. Wyatt
BY
Morgan Finnegan and Durham
ATTORNEYS

Feb. 13, 1940. R. A. WYATT 2,190,583
DUAL WHEEL STRUCTURE
Filed Aug. 19, 1937  2 Sheets-Sheet 2
Fig. 3.
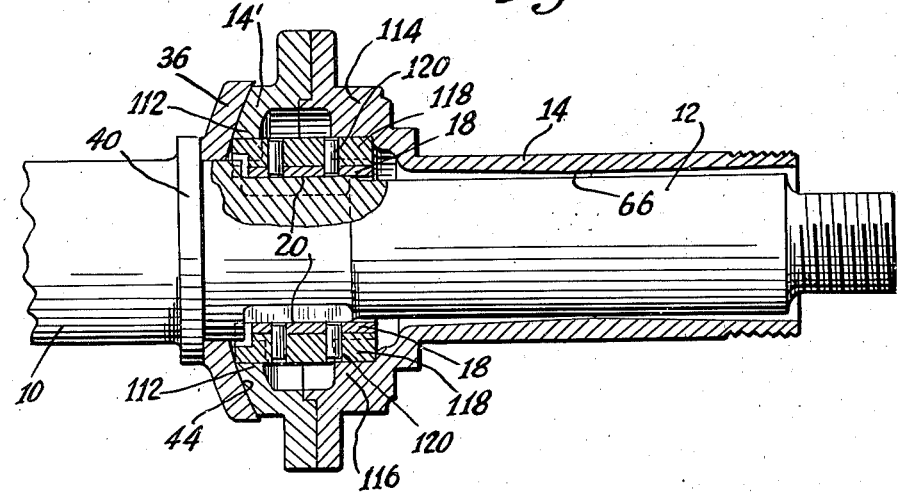
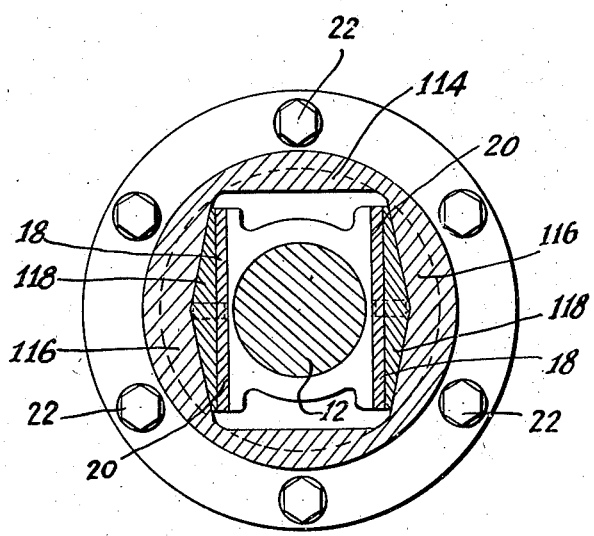
Fig. 4.
INVENTOR
R. A. Wyatt
BY
Morgan, Finnegan + Durham
ATTORNEYS Patented Feb. 13, 1940

2,190,583

UNITED STATES PATENT OFFICE 2,190,583

DUAL WHEEL STRUCTURE

Raymond A. Wyatt, Canton, Ohio, assignor to Differential Wheel Corporation, a corporation of Delaware Application August 19, 1937, Serial No. 159,819

9 Claims. (Cl. 301—1)

The present invention relates to dual wheeled vehicles and more particularly to novel and useful improvements in the axle and wheel structure of such vehicles.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate embodiments of the invention, and together with the description, serve to explain the principles of the invention.

Of the drawings:

Fig. 3 is a plan section taken on line 3—3 of Figure 1 with certain parts omitted; and Fig. 4 is a transverse section taken on the line 4—4 of Figure 1.

Figure 1:
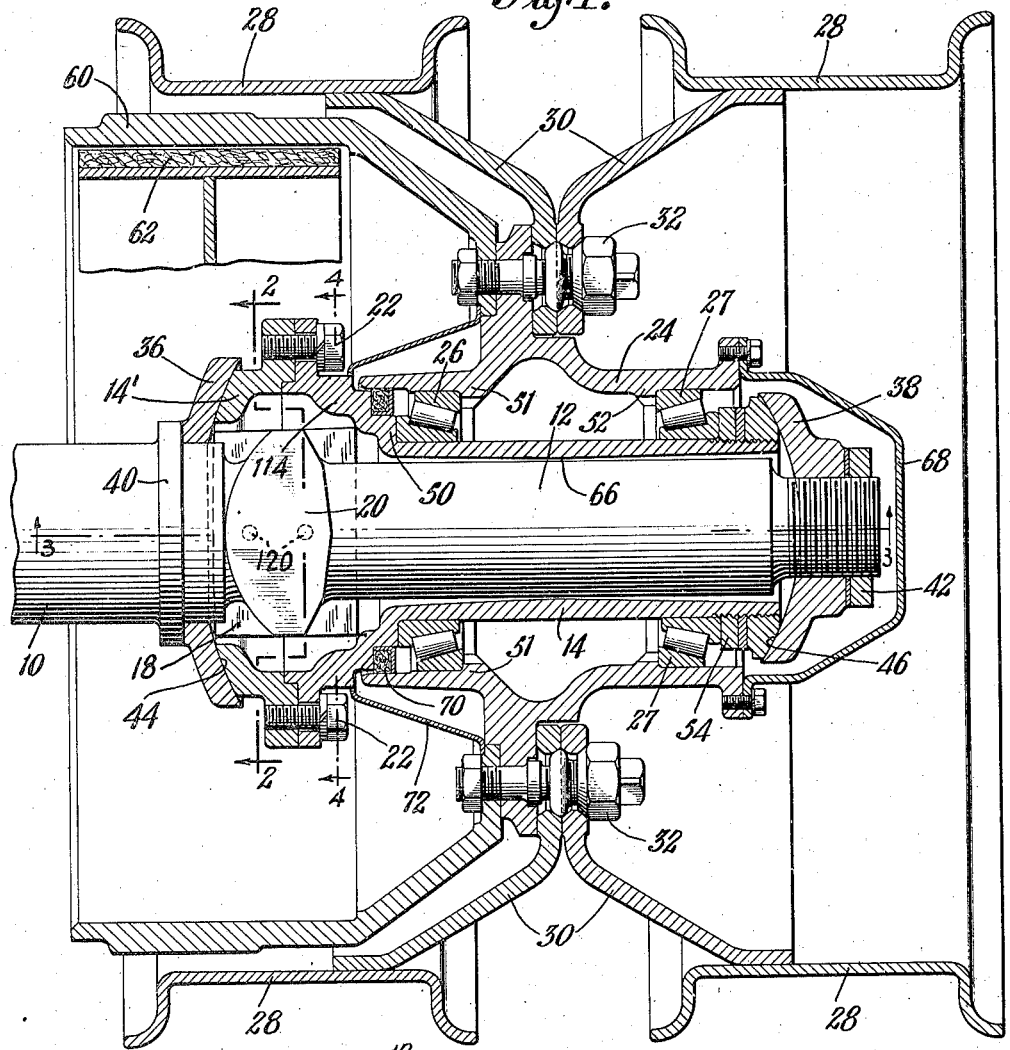
Figure 1 is a vertical section of one end of an axle and dual wheels embodying the present invention.
Figure 2:
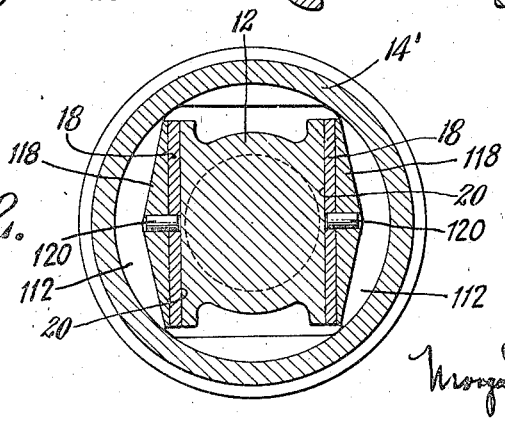
Figure 2 is a sectional view taken on the line 2—2 of Figure 1.

The present invention has for its object the provision of a novel dual wheeled structure in which improved means are provided for permitting the dual wheels to move so as to always remain perpendicular to the surface of the road or so as to carry a substantially equal load. A further object is the provision of a dual wheeled structure in which the wheels may move about two horizontal axes, one providing rotational movement and the other pivotal movement, the pivotal bearings being relatively large bearing surfaces spaced apart on opposite sides of the dual wheel assembly. The invention also provides a dual wheeled structure in which the dual wheels are supported for pivotal movement by means of spaced apart bearings and may be easily disassembled and reassembled, and involving no complicated or expensive parts.

As illustratively embodied, there is provided a pair of dual wheels, shown as of the non-independently rotatable type, which are rotatably journalled on a sleeve fitted over the end of the axle. The sleeve is held against rotational movement and against axial movement, but may move a limited amount about a horizontal axis perpendicular to the axle and is mounted for such movement by means of spaced apart, concentric, spherical bearing members, the convex surfaces being mounted at the ends of the sleeve while the cooperating concave surfaces are mounted on the axle end. Means are also provided for supporting the sleeve, while permitting its pivotal movement, in case of a failure of the spherical bearing surfaces. The sleeve and its cooperating bearing surfaces preferably provide a closed chamber which may retain a quantity of lubricant, and these bearing surfaces are preferably adjustable to take up any wear which may develop.

It will be understood that the foregoing general description and the following detailed description as well are exemplary and explanatory of the invention but are not restrictive thereof.

Referring now in detail to the illustrative embodiment of the invention as shown by the accompanying drawings, there is provided an axle 10 having a slightly reduced end 12. Fitted over the axle end 12 is a sleeve 14 and means are provided for preventing rotational movement of the sleeve with respect to the axle. These means comprise a pair of vertically disposed axially extending wear plates 18 fastened internally of the enlarged head 114 of the sleeve 14 and parallel to each other, being closely fitted to the flats 20 on the sides of the axle end and formed integrally therewith. For convenience in assembling the sleeve 14 and wear plates 18, the sleeve is provided with a detachable end portion 14' which is securely bolted by means of the screws 22. Wear plates 18 are mounted on backing plates 118 to which they are secured by pins 120.

Means are provided for rigidly positioning the backing plates 118 and wear plates 18 in the sleeve 14 so as to move therewith when the sleeve and wheels pivot in a vertical plane on the axle end 12. As embodied, the outer face of the backing plates 118 is formed of two plane surfaces arranged at a slight angle to one another so as to give the backing plate the shape of a double wedge. Formed on the inner surface of the enlarged head 114 of sleeve 14 are oppositely positioned bosses or pads 116, the inner surfaces of which are formed so as to support a portion of the outer wedge faces of backing plates 118. Similar support pads 112 are formed on the inner surface of detachable sleeve end 14'. Longitudinal movement of the backing plates 118 is prevented by their edges abutting on the concave bearing member 36 and a shoulder formed in the enlarged head 114 of sleeve 14. Thus, each wear plate 18 and its attached backing plate 118 is securely held in the sleeve 14 and sleeve end 14' in operable relationship to the flats 20 formed on the axle 12.

The wheels are rotatably journalled on the sleeve 14 and as shown, there is provided a hub portion 24 which is journalled on the sleeve 14 by means of the tapered roller bearings 26 and 27. The tires are mounted on conventional rims 28 and wheels 30 which are secured to the hub 24 by means of the bolts 32 as is the usual practice.

Means are provided permitting pivotal movement of the wheels about a horizontal axis and for supporting the sleeve on the axle end, at the same time restraining axial movement of the sleeve and wheels. As embodied, concentric spherically concave bearing members 36 and 38 are mounted on the axle end, one at either end of the sleeve 14. Bearing 36 is fitted over the inner portion of the axle end against shoulder 40, while the other bearing 38 is threaded onto the threaded outer axle end and is held in locked position by means of a lock nut 42. The ends of sleeve 14 are formed as correspondingly spherically convex bearing surfaces 44 and 46 concentric with each other and with the members 36 and 38, the common center of these surfaces 44 and 46 lying midway between the wheels and centrally of the axle end 12. Bearing 44 is shown as formed integrally with the end 14' while bearing 46 is formed as a lock nut threaded on the outer and threaded end of sleeve 14.

Bearing 26 is retained in position between the shoulders 50 and 51 on the sleeve 14 and hub 24 respectively, while bearing 27 is retained between the hub shoulder 52 and a threaded retaining ring 54 on the threaded sleeve end. Ring 54 is locked in position by spherical bearing 46.

Suitable braking means are provided and may comprise the brake drum 60 bolted to the inner side of hub 24 by nuts 32', to cooperate with suitable brake shoes 62.

In the normal operation of the structure, the wheels are supported and permitted to have pivotal movement on the axle end by reason of the cooperating bearing surfaces 36, 44 and 38, 46 which would allow universal pivotal movement except for the flats 20 and wear plates 18 and the load is carried by end thrust exerted against the relatively large surfaces of the bearings 36 and 38. As the surfaces wear, the wear may be taken up by simply tightening the threaded bearing 38. However, additional and emergency pivotal means are provided and comprise the internally reduced central portion 66 of the sleeve 14. This portion 66 is only slightly larger than the axle end 12, but normally does not touch this end 12. However, in case of maladjustment or excessive wear, this serves as an emergency pivotal bearing.

The space between the sleeve 14 and axle end 12 is closed at its ends and lubricant may be retained therewithin, while lubricant is retained around the roller bearings 26 and 27 by means of the hub cap 68 and the felt grease ring 70. A conical ring 72 fastened to the brake drum serves to prevent the possibility of grease leaking onto the brake shoes 62 or drum 60.

The dual wheeled structure may be disassembled by simply removing the nut 42 and bearing 38 after which the sleeve 14 and wheels may be pulled off the axle end, and in replacing the parts there is no possibility of their being incorrectly assembled.

The invention in its broader aspects is not limited to the specific mechanism shown and described but departures may be made therefrom within the scope of the accompanying claims without departing from the principles of the invention and without sacrificing its chief advantages.

What I claim is:

1. A dual wheeled axle structure including in combination, an axle end having a pair of concave bearing members spaced apart, a sleeve having correspondingly convex bearing surfaces at its ends and mounted between and by the concave members and a pair of dual wheels closely adjacent to each other and rotatably supported on the sleeve.

2. A dual wheeled axle structure including in combination an axle end having a pair of spherically concave bearing members spaced apart, a sleeve having correspondingly spherically convex bearing surfaces at its ends and mounted between and by the concave members, and a pair of dual wheels closely adjacent to each other and rotatably supported on the sleeve.

3. A dual wheeled axle structure including in combination an axle end having a pair of concave bearing members spaced apart, a sleeve having correspondingly convex bearing surfaces at its ends and mounted between and by the concave members, said bearing members having a common center, and a pair of dual wheels closely adjacent to each other and rotatably supported on the sleeve.

4. A dual wheeled axle structure including in combination an axle end having a pair of spherically concave bearing members spaced apart, a sleeve having correspondingly spherically convex bearing surfaces at its ends and mounted between and by the concave members, said bearing members having a common center, and a pair of dual wheels closely adjacent to each other and rotatably supported on the sleeve.

5. A dual wheeled axle structure including in combination, an axle end having a pair of spherically concave bearing members spaced apart, a sleeve having correspondingly spherically convex bearing surfaces at its ends and mounted between and by the concave members, a pair of dual wheels closely adjacent to each other and rotatably supported on the sleeve, and means for preventing movement of said wheels except about horizontal axes.

6. A dual wheeled axle structure including in combination, an axle end having a pair of spherically concave bearing members spaced apart, a sleeve having correspondingly spherically convex bearing surfaces at its ends and mounted between and by the concave members, said bearing members having a common center, a pair of dual wheels closely adjacent to each other and rotatably supported on the sleeve, and means for preventing movement of said wheels except about horizontal axes.

7. A dual wheeled axle structure including in combination, an axle end having a pair of spherically concave bearing members spaced apart, a sleeve having correspondingly spherically convex bearing surfaces at its ends and mounted between and by the concave members, said bearing members having a common center, a pair of dual wheels closely adjacent to each other and rotatably supported on the sleeve, means for preventing movement of said wheels about vertical axes, and means for variably positioning the concave members relatively to each other to maintain the bearing surfaces in close engagement.

8. A dual wheeled axle structure including in combination, an axle end having a pair of spaced apart spherically concave bearing members, a pair of closely adjacent wheels having their midpoint between the bearing members, a pair of spherically convex bearing members on which the wheels are supported, said concave and convex members being concentric and interfitting, and cooperating flat, vertical bearing surfaces for maintaining the wheels against movement about a vertical axis.

9. A dual wheeled axle structure including in combination, an axle end having a pair of concave bearing members spaced apart, a sleeve having correspondingly convex bearing surfaces at its ends and mounted between and by the concave members, said sleeve having an internally reduced portion of slightly larger size than the adjacent portion of the axle to support the sleeve, and wheels in case of failure of any of the concave surfaces.

RAYMOND A. WYATT.